(12) United States Patent
Beghini et al.

(10) Patent No.: US 6,524,013 B2
(45) Date of Patent: Feb. 25, 2003

(54) SEALED SUSPENSION THRUST BEARING

(75) Inventors: Eric Beghini, La Membrolle (FR); Christophe Houdayer, Tours (FR); Jean-Pierre Collognat, Plymouth, MI (US)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/874,384

(22) Filed: Jun. 6, 2001

(65) Prior Publication Data

US 2002/0009249 A1 Jan. 24, 2002

(30) Foreign Application Priority Data

Jun. 7, 2000 (FR) ............................................. 00 07296

(51) Int. Cl.$^7$ .............................................. F16C 19/10
(52) U.S. Cl. ...................................................... 384/602
(58) Field of Search .................................. 384/607, 617, 384/620, 615, 622

(56) References Cited

U.S. PATENT DOCUMENTS

| | | | |
|---|---|---|---|
| 4,948,272 A | 8/1990 | Stowe | |
| 4,995,737 A | 2/1991 | Moller et al. | |
| 6,267,512 B1 | 7/2001 | Beghini et al. | |

FOREIGN PATENT DOCUMENTS

| | | |
|---|---|---|
| DE | 197 52 268 | 5/1999 |
| EP | 0 390 331 | 10/1990 |
| EP | 1 000 781 | 5/2000 |
| FR | 2 579 697 | 10/1986 |
| FR | 2 779 096 | 12/1999 |
| JP | 8-219150 | 8/1996 |

*Primary Examiner*—Lenard A. Footland
(74) *Attorney, Agent, or Firm*—Smith, Gambrell & Russell

(57) ABSTRACT

A suspension thrust bearing includes a first race, a second race, a row of rolling members disposed between the two races, a cap fastened to the first race and a sealing member that is fastened to a rotary or non-rotary member and cooperates with a respectively non-rotary or rotary surface. The sealing member includes a seal that is initially separate from the cap. The seal is mounted on the cap. It has a bead which is force-fitted in an annular groove in the cap. The seal is disposed axially between the cap and the second race or another cap fastened to the second race and has a lip that comes into rubbing contact with a bearing surface formed by a surface of the second race or of the other cap fastened to the second race.

10 Claims, 2 Drawing Sheets

SEALED SUSPENSION THRUST BEARING

CROSS-REFERENCE TO RELATED APPLICATIONS

This application is based on French Patent Application No. 0007296 filed Jun. 7, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to suspension thrust bearings used in automobile vehicles in particular in telescopic suspension arms of the wheels that can pivot to steer the vehicle.

2. Description of the Prior Art

A suspension thrust bearing generally includes a top race and a bottom race with rolling members in the form of balls or rollers disposed between them.

The invention relates more particularly to suspension thrust bearings including at least one synthetic material cap in contact with one of the two races of the bearing.

The suspension thrust bearing is at the top of the suspension arm, between a bottom metal cup, which also provides a bearing seat for a suspension spring, and a top member fastened to the body of the vehicle. This is known in the art. The spring of the suspension device surrounds the piston rod of the damper piston, whose end is fastened to an elastic support block. The suspension thrust bearing enables relative rotation of the bearing cup for the spring, which is rotatable, and the elastic support block, which is fixed to the body of the vehicle. The suspension thrust bearing also transmits axial forces between the spring and the body of the vehicle. Relative angular movement between the bearing cup for the spring and the elastic support block results from pivoting of the wheel to steer the vehicle and/or compression of the suspension spring. For more information see French patent No. 2 779 096.

The suspension thrust bearings are located under the body of the vehicle and in the immediate vicinity of the wheels, which throw up polluting material that can penetrate into the bearings, especially in wet weather.

A device including one or two plastics material caps can be used. This is known in the art, for example from the documents U.S. Pat. No. 4,995,737 and EP-A-390 331. Each cap encloses one race and has axial retaining means cooperating with the other cap. The seal is then provided by lips on one of the caps rubbing on the other cap.

The caps are generally made from glass-fiber reinforced plastics material to give them the necessary strength and stiffness. This material is too rigid to provide a sufficiently effective seal. Force-fitting seals over the races of the bearing can also be envisaged, but in this case it is necessary to use seals with a metal armature, which is relatively costly (see for example the document JP 08-219 150).

The invention proposes a compact suspension thrust bearing that provides a good seal and cannot accidentally fall apart during handling or transportation prior to its permanent installation on the suspension arm.

SUMMARY OF THE INVENTION

The invention provides a suspension thrust bearing including a first race, a second race, a row of rolling members disposed between the two races, a cap fastened to the first race, and a sealing member fastened to a rotary or non-rotary member and adapted to cooperate with a respectively non-rotary or rotary surface, the sealing member including a seal that is initially separate from the cap, adapted to be mounted on the cap, has a bead adapted to be force-fitted in an annular groove in the cap, is disposed axially between the cap and the second race or another cap fastened to the second race, and has a lip adapted to come into rubbing contact with a bearing surface formed by a surface of the second race or of the other cap fastened to the second race.

The bearing surface in contact with the lip can be a substantially radial surface.

The seal preferably has a bead fixed into an annular groove in the cap. The diameter of the groove can be substantially equal to the outside diameter of the row of rolling members.

In one embodiment of the invention the first race has a radial portion adapted to partly overlap the bead. The radial portion locks the bead in the groove.

In one embodiment of the invention the surface of the rotary race is adjacent a concave surface forming a rolling path for the rolling members.

In one embodiment of the invention the cap has means for fastening it axially to the rotary race.

In one embodiment of the invention the cap has means for fastening it axially to the other cap.

In one embodiment of the invention the lip of the seal extends radially outward from the bead.

In one embodiment of the invention the lip of the seal extends downward from the bead in an assembled configuration of the bearing.

The seal is advantageously disposed radially between the rolling members and a substantially axial skirt. The skirt can be part of the cap.

In one embodiment of the invention the skirt is adapted to retain the second race or the other cap fastened to the second race.

A suspension thrust bearing is obtained whose overall radial and axial dimensions are not increased compared to prior art bearings, which provides a good seal and incorporates means for fastening the various components together.

The present invention will be better understood and other advantages will become apparent on reading the following detailed description of a few embodiments of the invention, which are described by way of non-limiting example and shown in the accompanying drawings.

DETAILED DESCRIPTION OF THE PREFERRED EMBODIMENTS

Figure 1:
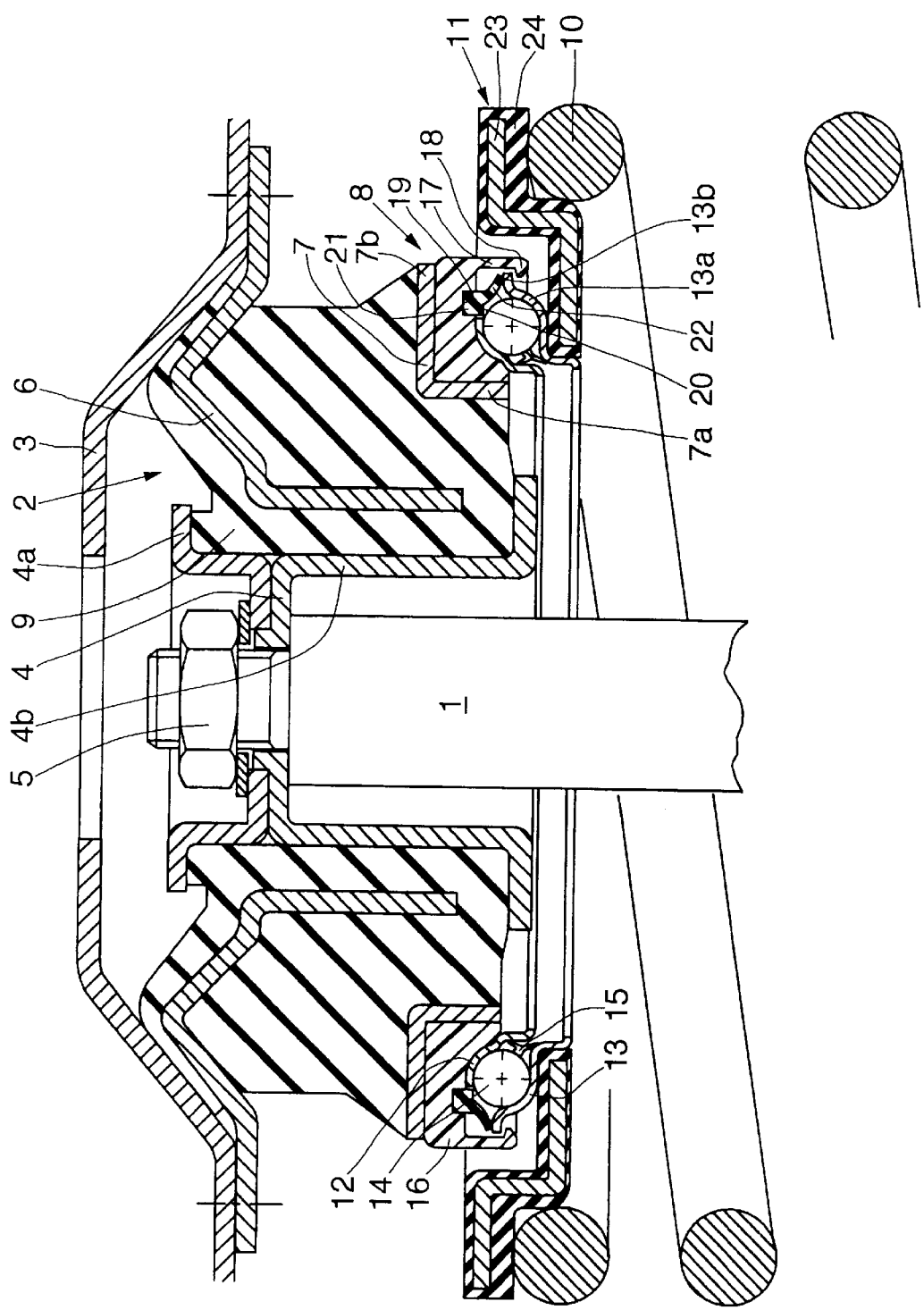
FIG. 1 is a view in axial section of an assembled suspension thrust bearing.

A damper includes a cylinder inside which slides a piston whose piston rod 1 is connected at the top end to an elastic support block 2 which bears on the inside of a member of the chassis 3 forming a seat and to which it is fastened.

The elastic support block 2 includes:

an inner connecting member 4 which consists of two parts 4a and 4b and to which the end of the piston rod 1 of the damper piston is attached by means of a nut 5, an outer connecting member 6 adapted to be fastened to the chassis 3, a top cup 7 providing a bearing seat for the thrust bearing 8, and a rubber block 9 stuck to the surface of the above three components to provide a coupling between them that filters vibration.

The outer connecting member 6 is fixed, for example screwed or bolted, to the chassis 3 at one end and its other end is disposed axially between the two parts 4a and 4b. The top cup 7 is at the same level as the inner connecting member 4, in the axial direction, but has a larger diameter. The suspension spring 10 can also be seen, its top end bearing on the bottom cup 11 which in turn bears on the thrust bearing 8.

The top cup 7 has a downwardly-extending cylindrical portion 7a on the opposite side to the chassis 3 and an outwardly-extending radial portion 7b. The inside surface of the cylindrical portion 7a and the top surface of the radial portion 7b are covered by the elastic material of the elastic support block 2.

Figure 2:
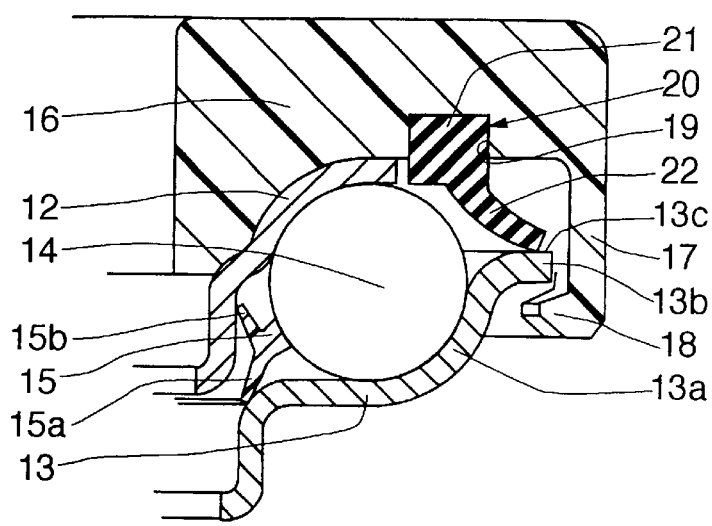
FIG. 2 shows a detail from FIG. 1.

The suspension thrust bearing 8 as such can be seen more clearly in FIG. 2 and includes a sheet metal top race 12 and a sheet metal bottom race 13 with balls 14 between them. The balls 14 are retained by a synthetic material cage 15 which is extended on one side by a sealing lip 15a which rubs on the bottom race 13 and on the other side by a lip 15b which rubs on a bearing surface of the top race 12.

The thrust bearing 8 further includes a top cap 16 made from a synthetic material such as glass-fiber reinforced polyamide and covering the surface of the top race 12 opposite the rolling members 14. Its shape is complementary to that of the outside surface of the axial portion 7a and the bottom surface of the radial portion 7b of the top cup 7. The top cap 16 includes a substantially tubular skirt 17 extending downward from its larger diameter edge and radially surrounding at least part of the rolling members 14. Inwardly projecting radial protuberances 18 form hooks around the central passage of the skirt 17, near its bottom free end.

The bottom race 13 has a toroidal portion 13a which has a concave surface matching the rolling members 14 and a radial portion 13b extending the toroidal portion 13a outwardly and situated substantially half-way up the height of the rolling members. The diameter of the free end of the radial portion 13b is greater than that of the circle circumscribed through the tops of the hooks 18. The hooks 18 are therefore adapted to retain the bottom race 13 axially relative to the remainder of the thrust bearing prior to permanent installation in the suspension system.

The hooks 18 could of course be replaced by a continuous annular bead projecting radially inward.

The top cap 16 further includes an annular groove 19 with a substantially radial bottom and substantially axial rims in the vicinity of the larger diameter free end of the top race 12, at a level above that of the rolling members 14. The groove 19 has a diameter greater than that of the circumscribed circle through the centers of the rolling members 14.

The thrust bearing 8 is completed by a seal 20, made of rubber, for example, including a bead 21 force-fitted into the groove 19 and a lip 22 extending downward and radially outward from the bead 21 and in rubbing contact with a bearing surface consisting of the top surface 13c of the radial portion 13b of the bottom race 13. The surface 13c is annular and substantially radial. It is conceivable that it could be inclined, however.

A seal is therefore provided on the outside of the rolling members 14 by virtue of the narrow passage formed between the skirt 17 of the top cap 16 and the free end of the radial portion 13b of the bottom race 13 and the contact between the sealing lip 22 and the radial portion 13b of the bottom race 13. This provides a very good seal. On the inside of the rolling members 14, the seal is provided by the lips 15a and 15b on the cage 15 respectively in contact with the bottom race 13 and the top race 12. Once again, a good seal is obtained.

The bottom race 13 of the thrust bearing 8 bears on the bottom cup 11 which includes a metal armature 23 covered with a synthetic material portion 24 which also filters vibration transmitted from the wheels of the vehicle to the body.

Figure 3:
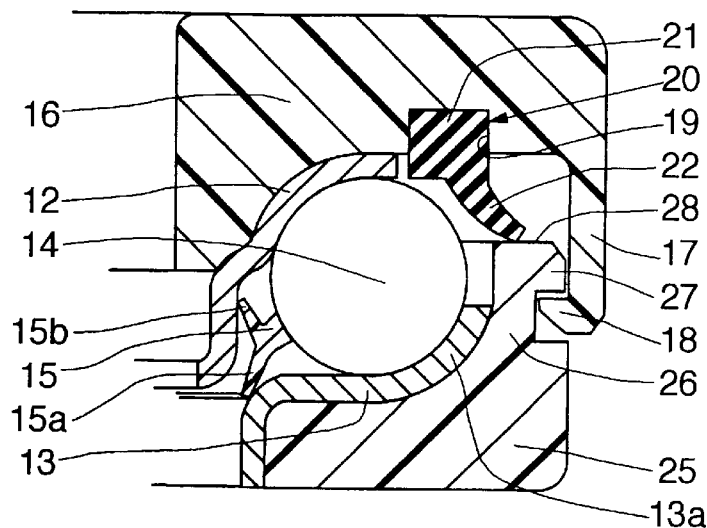
FIGS. 3 and 4 show variants of the bearing.

FIG. 3 shows a variant in which the bearing is disposed between a top cap 16 and a bottom cap 25. The bottom cap 25 bears on the bearing cup for the spring 11 and has an axial protuberance 26 that extends upward between the rolling members 14 and the skirt 17 of the cap 16. The axial protuberance 26 has an annular bead 27 facing radially outward and adapted to cooperate with the bead or the hooks 18 on the skirt 17 for mutual axial retention of the top cap 16 and the bottom cap 25.

The annular top surface 28 of the protuberance 26 provides a bearing surface for the lip 22 of the seal 20. Here the surface 28 is radial, but it could be oblique. Here the bottom race 13 is shorter than in the previous embodiment and has no cylindrical portion projecting toward the outside concave portion 13a. The top race 12 has a free end that is flush with the inside edge of the groove 19 and is therefore in contact with the bead 21 of the seal 20.

Figure 4:
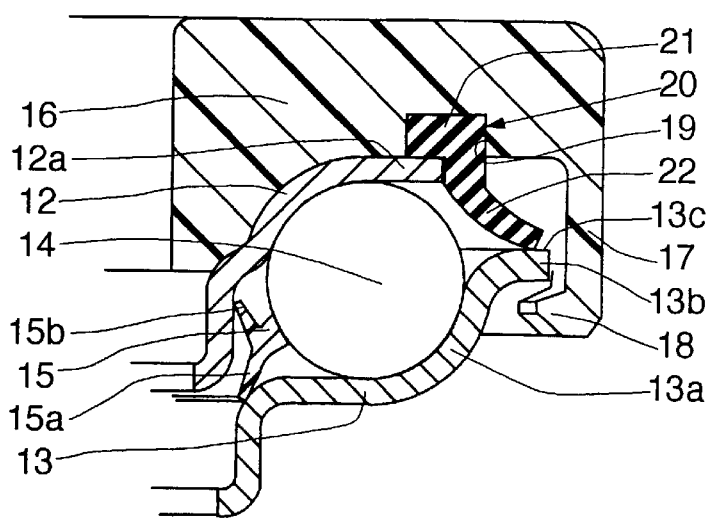

In the FIG. 4 embodiment the top race 12 is extended radially outward and partly covers the bead 21 of the seal 20 and locks it in the groove 19 to prevent it from becoming detached. This embodiment is particularly effective during handling preceding final fitting.

The fact that the seal 20 is separate from the top cap 16 means that the top cap 16 can be made from a very rigid material, for example a material reinforced with fibers, especially glass fibers, and the seal 20 can be made from a material having the flexibility required for a good seal, for example an elastomer or a very flexible plastics material with no glass-fiber reinforcement. Force-fitting the sleeve 20 into the groove 19 guarantees reliable retention of the seal 20.

As a variant of what is shown in FIG. 3, the bottom cap 25 could also provide a bearing seat for the spring 10, replacing the bearing cup 11.

As a variant of what is shown in FIG. 4, an embodiment could be envisaged in which the bottom race 13 also serves as a bearing seat for the spring 10, replacing the bearing cup 11.

The invention provides a seal for a compact thrust bearing offering particularly high performance in terms of efficiency and durability.

In other words, the durability and reliability of the thrust bearing is enhanced by the effectiveness of the seal and its resistance to aging.

There is claimed:

1. A suspension thrust bearing including a first race, a second race, a row of rolling members disposed between said two races, a cap fastened to said first race, and at least one sealing member fastened to a rotary or non-rotary member and adapted to cooperate with a respectively non-rotary or rotary surface, said sealing member including a seal that is initially separate from said cap, adapted to be mounted on said cap, has a bead adapted to be force-fitted in an annular groove in said cap, is disposed axially between said cap and said second race or another cap fastened to said second race, and has a lip adapted to come into rubbing contact with a bearing surface formed by a surface of said second race or of said other cap fastened to said second race.

2. The bearing claimed in claim 1 wherein said bearing surface in contact with said lip is a substantially radial surface.

3. The bearing claimed in claim 2 wherein said first race has a radial portion adapted to partly overlap said bead.

4. The bearing claimed in claim 1 wherein said surface of said rotary race is adjacent a concave surface forming a rolling path for said rolling members.

5. The bearing claimed in claim 1 wherein said cap has means for fastening it axially to said rotary race.

6. The bearing claimed in claim 1 wherein said cap has means for fastening it axially to said other cap.

7. The bearing claimed in claim 1 wherein said lip of said seal extends radially outward from said bead.

8. The bearing claimed in claim 1 wherein said lip of said seal extends downward from said bead in an assembled configuration of said bearing.

9. The bearing claimed in claim 1 wherein said seal is disposed radially between said rolling members and a substantially axial skirt.

10. The bearing claimed in claim 9 wherein said skirt is adapted to retain said second race or said other cap fastened to said second race.

* * * * *